Feb. 18, 1941.　　C. F. HASSELWANDER　　2,232,065
AIR FILTER
Filed June 20, 1938　　3 Sheets-Sheet 1

INVENTOR
CLAUDE F. HASSELWANDER
BY
ATTORNEY

Feb. 18, 1941. C. F. HASSELWANDER 2,232,065
AIR FILTER
Filed June 20, 1938 3 Sheets-Sheet 2

INVENTOR
CLAUDE F. HASSELWANDER
BY
ATTORNEY

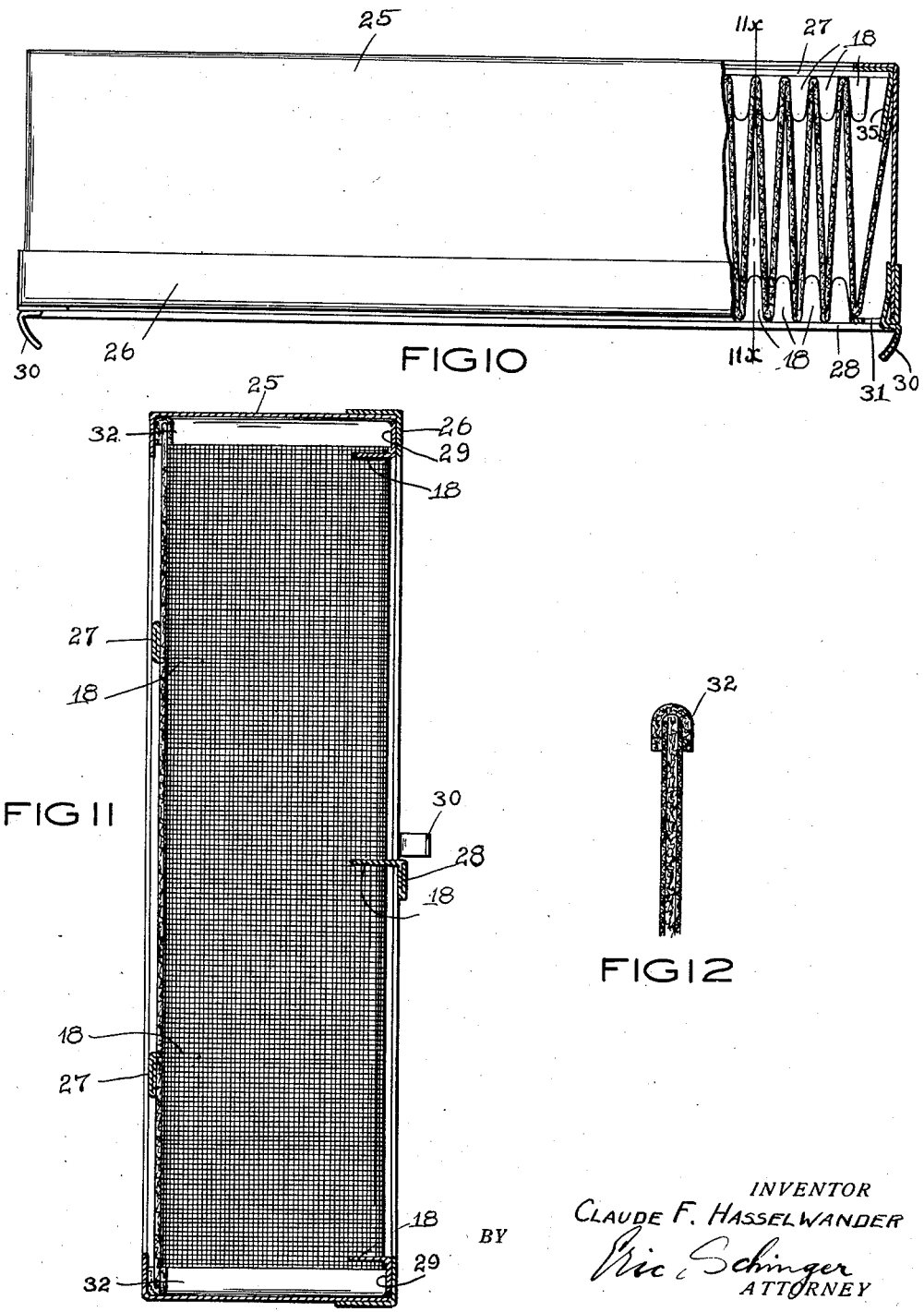

Patented Feb. 18, 1941

2,232,065

UNITED STATES PATENT OFFICE 2,232,065

AIR FILTER

Claude F. Hasselwander, Rochester, N. Y., assignor to Staynew Filter Corporation, Rochester, N. Y., a corporation of New York Application June 20, 1938, Serial No. 214,678

2 Claims. (Cl. 183—44)

This invention relates to air filters and has for its principal object to greatly reduce the fire hazard in filters embodying an inflammable filtering medium.

Another object of this invention is to so construct an air filter that its inflammable filtering medium will not readily catch fire.

A further object of this invention is to construct an air filter embodying inflammable filtering medium so that when set afire its combustion will be retarded and restricted to small areas.

All these and other objects and attendant advantages will become more readily apparent from the detailed description of the invention which follows, reference being had to the accompanying drawings in which—

Figure 10 is a top plan view and partial horizontal section of a modified form of the filter panel embodying my invention.

Figure 11 is a vertical sectional view thereof taken on the line 11x—11x of Figure 10.

Figure 12 is an enlarged vertical sectional view of the upper portion of the filtering medium provided with a modified end sealing member.

The filter, forming the subject matter of this invention, is especially adapted for use in filtering units having replaceable or renewable filter inserts. In the construction of the filter preferably cotton or wool felt is used for the filtering medium but other material or fabrics having suitable filtering properties may be used instead.

Figure 6:
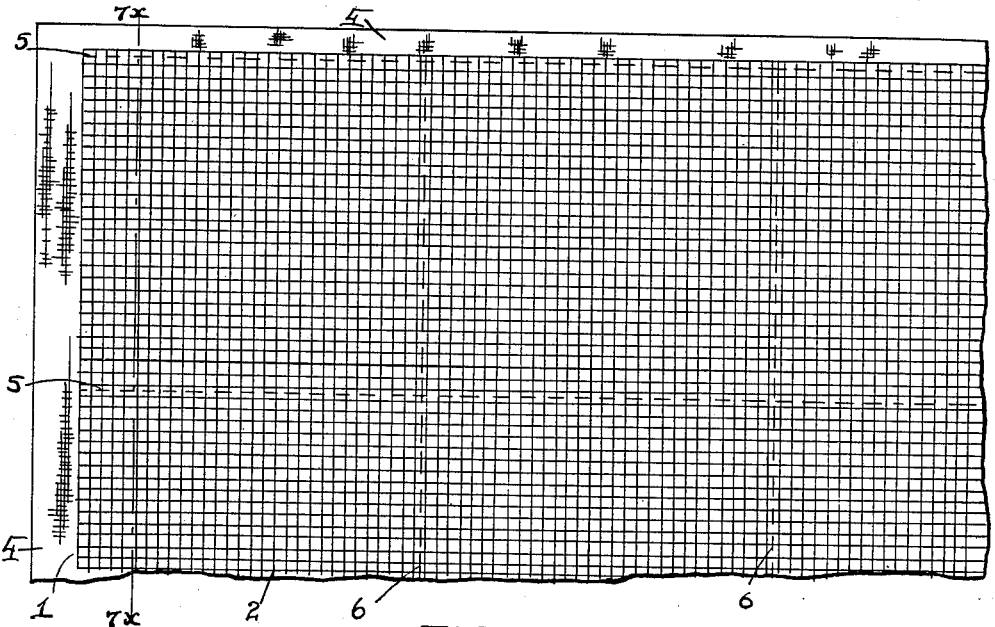
Figure 6 is a plan view of a portion of the filtering medium and its mounting.
Figures 7, 8:
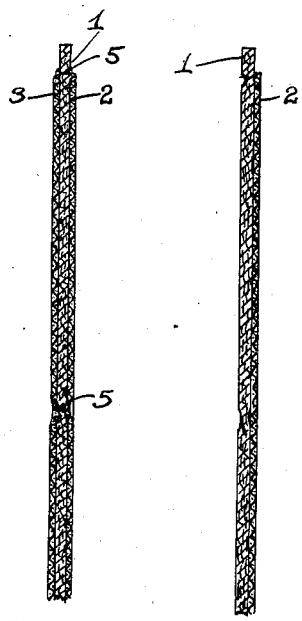
Figure 7 is a cross section thereof taken on the line 7x—7x of Figure 6.
Figure 8 is a cross section of a modified form of the filtering medium and its mounting.

As illustrated in Figures 6 and 7 of the drawings, a suitable layer of the filtering medium 1 is placed between the metal screens 2 and 3 which have a mesh that is preferably one quarter inch or less. The screens are located so that the edges of the filtering medium project beyond them and provide a flexible sealing flange 4 around the entire perimeter of the filter as will hereinafter appear. The screens and filtering sheet are fastened together along the edges and at suitable points by stitching or otherwise fastening the screens together with the filtering sheet between them. Suitable thread, wire or staples may be used for this purpose in order to firmly clamp the screens together along predetermined lines, as for example at 5 and 6 in Figures 6 and 7 so that the screens with the filtering medium are divided into small individual filtering areas around which the thread, wire or staples form a fire restricting barrier by compressing the filtering medium between the screens along the line of connection.

Figure 9:
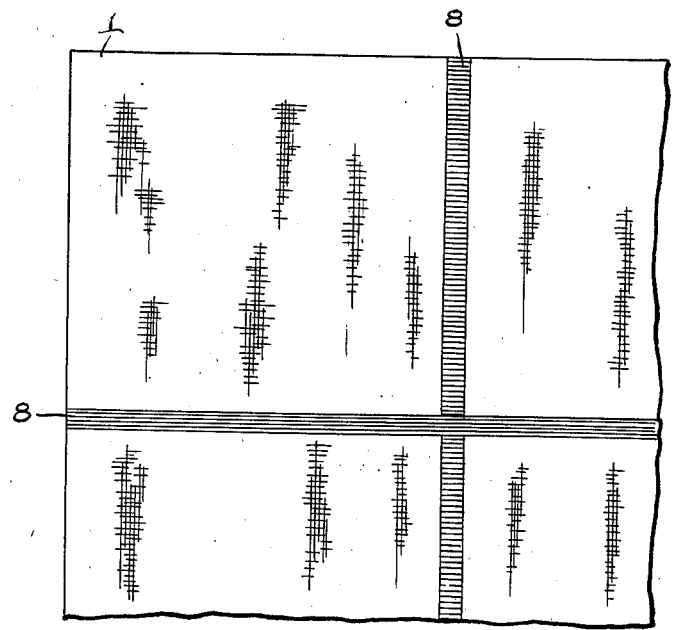
Figure 9 is a plan view of a portion of the filtering medium.

In Figure 9 I have illustrated a form of filtering medium which is prepared to incorporate therein fire restricting barriers. This is done by coating the surface or impregnating the filtering medium at suitable intervals along narrow strips 8, 8 with a fire resisting medium such as water glass in such a manner that these strips divide the area of the filtering medium into a series of sections surrounded by the fire resisting water glass. In this way the combustion of the filtering material in each section is arrested by the fire barrier provided by the strips of fire resisting coating which surrounds them.

Mounting the filtering medium between metal screens confines the filtering medium between efficient heat conductors which carry off and quickly distribute the heat that may be applied to the filter in case of fire. This action, in addition to the well known fact that a flame will not pass thru a screen, will protect the filtering medium from being quickly set afire when a flame directly impinges against the filter. The only thing that can happen when fire is brought in contact with the filter is that the filtering medium will char with a slow combustion and even this will be restricted to small areas by being arrested at the fire barriers provided in the filter as above described.

Figure 1:
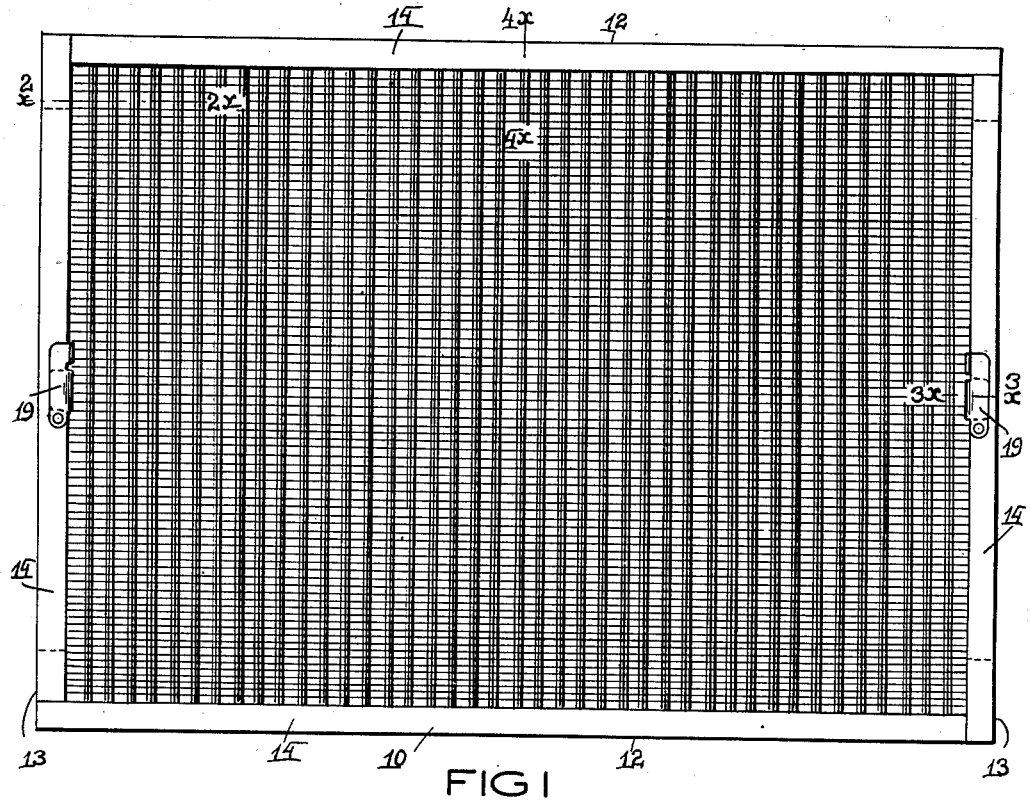
Figure 1 is a front elevation of a filter panel embodying the novel filter construction.
Figure 2:
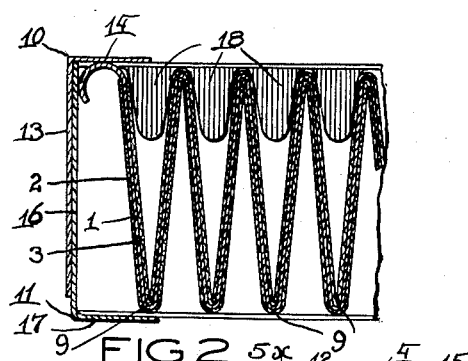
Figure 2 is an enlarged detail sectional view taken on the line 2x—2x of Figure 1.
Figure 3:
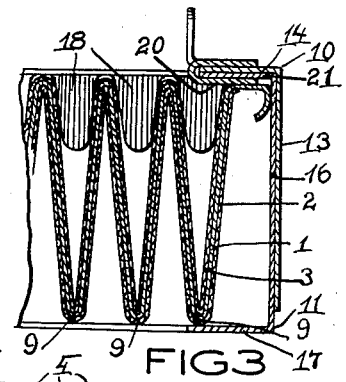
Figure 3 is an enlarged detail sectional view taken on the line 3x—3x of Figure 1.
Figure 4:
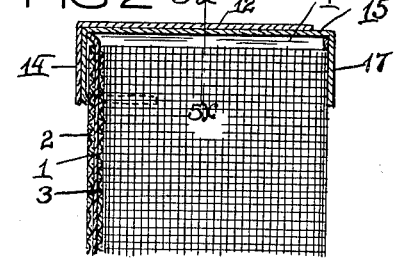
Figure 4 is an enlarged detail sectional view taken on the line 4x—4x of Figure 1.
Figure 5:
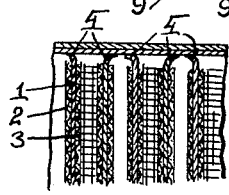
Figure 5 is a section taken on the line 5x—5x of Figure 4.

With the filtering medium held in place between the screens, as above described, it is folded into V shaped sections 9, 9 as illustrated in Figures 1, 2 and 3. The edges of the V shaped folds of the screens thus additionally compress the filtering medium between them and provide additional fire resisting barriers for the filtering medium. In the folded filter the sealing flange 4, provided by the filtering medium in projecting beyond the screens, is then located at the ends of the series of folds as well as the edges of each of the folds. The completed filter is mounted in a frame or panel made up of two sections 10 and 11 which are telescoped together to hold the filter between them.

Section 10 of this filter panel has the sides 12 and ends 13 including a flange 14 which project inwardly therefrom. The folded filter is placed into this panel so as to have the ends of one side of the V shaped folds rest against the flange 14 while the sealing flange 4, provided by the protruding filtering medium, adjusts itself and is yieldingly held against the sides and ends of the panel section by the screens to prevent air from passing thru the panel past the edges of the filter.

After the filter is placed into panel section 10 a similar panel section 11 is telescoped over it to have its sides 15 and ends 16 embrace the corresponding sides and ends of section 10 while its inwardly extending flange 17 rests against the opposite ends of the V shaped folds of the filter. In order to keep the V shaped folds of the filter properly spaced, the flange 17 is provided on its under side with a series of spacing fingers 18 along each side of the panel section. These spacing fingers are adapted to part way engage into the V shaped folds to uniformly hold them expanded and spaced in the filter panel.

For the purpose of locking panel section 11 to section 10, a pair of locking members 19, 19 are pivotally mounted on the flange 14 of section 10. These locking members have a flange 20 bent parallel thereto on the under side thereof to provide a laterally extending narrow locking channel between them. This locking channel is adapted to embrace the flange 17 of section 11 and a locking flange 21 projecting from the section 10 so as to hold these two flanges and in turn the two sections locked together.

In the modified form of the filtering panel illustrated in Figures 11 and 12, the casing 25, as well as the removable cover 26 thereof, are provided with spacing fingers 18. On the casing 25 these spacing fingers are carried by two cross members 27, 27 which extend across the open end of the casing and on the cover 26 the spacing fingers are carried by a central cross member 28 and by suitable flanges 29 at the top and bottom of the cover. In this way the folds of the filtering medium are held expanded at the front and back thereof.

A pair of spring latches 30, 30, carried by the casing and passing thru suitable openings 31 in the cover, are used to removably lock the cover 26 to the casing 25.

Instead of having the filtering medium project beyond the edges of the screens on each side thereof so as to provide a sealing strip along the top and bottom of the folds, a separate felt strip 32 may be folded over the top edge of the filter from one screen to the other, as illustrated in Figure 12, and suitably fastened in place to the screens.

To hold the edges of the ends of the filtering medium in place on the inside wall of the casing of the filtering panel, the anchoring flange 35 is provided on the inside of the filtering panel. This flange angularly projects from the inside wall to permit the edge of the filtering medium to engage between it and the wall of the casing as illustrated in Figure 10.

From the foregoing it will be apparent that my novel construction of a filter panel and novel filter results in an extremely simple, inexpensively constructed but highly efficient filter construction. Some changes may be made in the construction and arrangement of parts without departing from the real spirit and purpose of the invention and it is my intention to cover by my claims any modified forms of the structure which may be reasonably included within their scope.

I claim:

1. A filtering medium for a fire resisting air filter comprising a sheet of woven or compressed fibers and means dividing the surface of said sheet into restricted areas, said means comprising a non-inflammable coating so as to surround said restricted areas with a fire resisting barrier.

2. A filtering medium for a fire resisting air filter comprising a sheet of woven or compressed fibers and means dividing the sheet into restricted sections, said means comprising a non-inflammable substance applied to the filtering medium in strips for impregnation of the filtering medium around the restricted sections so as to surround said sections with a fire resisting barrier.

CLAUDE F. HASSELWANDER.